US011871887B2

(12) United States Patent
Chu

(10) Patent No.: US 11,871,887 B2
(45) Date of Patent: Jan. 16, 2024

(54) DISHWASHER THERMOMETER WITH WIRELESS TEMPERATURE LOGGER AND ASSOCIATED METHODS

(71) Applicant: Ewig Industries Macao Commercial Offshore Limited, Macau (CN)

(72) Inventor: Luk Wah Jackson Chu, Macau (CN)

(73) Assignee: EWIG INDUSTRIES INTERNATIONAL CO. LIMITED, Macau (CN)

( * ) Notice: Subject to any disclaimer, the term of this patent is extended or adjusted under 35 U.S.C. 154(b) by 8 days.

(21) Appl. No.: 17/238,675

(22) Filed: Apr. 23, 2021

(65) Prior Publication Data

US 2021/0235965 A1   Aug. 5, 2021

Related U.S. Application Data

(62) Division of application No. 16/024,328, filed on Jun. 29, 2018, now abandoned.

(51) Int. Cl.
| | |
|---|---|
| A47L 15/42 | (2006.01) |
| G01K 13/02 | (2021.01) |
| A47L 15/00 | (2006.01) |

(52) U.S. Cl.
CPC ....... *A47L 15/4287* (2013.01); *A47L 15/0063* (2013.01); *A47L 15/4285* (2013.01); *G01K 13/02* (2013.01); *A47L 2401/12* (2013.01); *A47L 2501/26* (2013.01); *A47L 2501/30* (2013.01); *G01K 13/026* (2021.01)

(58) Field of Classification Search
None
See application file for complete search history.

(56) References Cited

U.S. PATENT DOCUMENTS

| | | | |
|---|---|---|---|
| 9,119,522 B1 * | 9/2015 | Barksdale | A47L 15/4293 |
| 2004/0258129 A1 | 12/2004 | Rund | |
| 2015/0233848 A1 * | 8/2015 | Zhou | G01K 3/04 |
| | | | 702/130 |
| 2018/0353003 A1 | 12/2018 | Sabata | |
| 2019/0014968 A1 | 1/2019 | Padtberg | |

FOREIGN PATENT DOCUMENTS

EP             2433547      *  3/2012

* cited by examiner

*Primary Examiner* — Mikhail Kornakov
*Assistant Examiner* — Ryan L Coleman
(74) *Attorney, Agent, or Firm* — Cozen O'Connor

(57) ABSTRACT

A dishwasher thermometer captures temperature data of temperature sensed within a dishwasher during a wash cycle. The dishwasher thermometer includes a wireless communication interface that transmits the captured temperature data to one or more of a server and a monitor device. When the captured temperature data indicates that the wash cycle did not achieve defined temperature threshold(s), an alert is generated at the server and/or the monitor device indicating that the wash cycle did not meet appropriate washing conditions. In embodiments, the temperature data may be accessible to a third party for certification of the dishwasher wash cycle.

6 Claims, 5 Drawing Sheets

DISHWASHER THERMOMETER WITH WIRELESS TEMPERATURE LOGGER AND ASSOCIATED METHODS

CROSS-REFERENCE TO RELATED APPLICATIONS

This application is a divisional of U.S. patent application Ser. No. 16/024,328, filed Jun. 29, 2018. The contents of this application are incorporated herein by reference in its entirety.

BACKGROUND

Dishwashers are designed for cleaning dishware and cutlery. The domestic dishwasher cleans by spraying hot water at the dishes. In addition to domestic dishwashers, industrial dishwashers are used in commercial establishments such as hotels and restaurants where a large number of dishes must be cleaned. Washing is conducted with temperatures typically between 45 to 82° C. (110 to 180° F.), depending on the temperature profile of the given dishwasher machine.

Commercial establishments are governed by strict compliance codes for the temperature at which dishware and cutlery is washed to ensure proper sanitization and cleaning of the dishware. Traditionally, a strip thermometer is attached to a plate, or other surface, during the wash cycle and an employee manually records the highest temperature detected by the strip. These strips, however, are inefficient as they are discarded after use and require manual labor to record the temperature reading.

Other temperature sensor monitoring systems include a digital temperature sensor, placed into the dishwasher during the wash cycle, and an LCD screen for displaying the highest temperature attained during the wash cycle. These temperature sensor monitoring systems, however, suffer from similar disadvantages to the strips discussed above. For example, an employee must manually record the data from the LCD screen to a spreadsheet. This process is susceptible to fraudulent reporting, whether deliberate or accidental. Another disadvantage is that these strips, and temperature sensor monitoring systems do not include a data logger for capturing and securely storing temperatures such that historical analysis of the dishwasher is possible.

SUMMARY OF THE EMBODIMENTS

In a first aspect, a dishwasher thermometer with wireless temperature logger, comprises: a processor; a temperature sensor; a wireless communications interface; and, memory storing non-transitory computer readable instructions that when executed by the processor control the processor to: determine a maximum temperature sensed by the temperature sensor during a wash cycle of a dishwasher, and transmit, via the wireless communications interface, the maximum temperature to a remote device.

In some embodiments of the first aspect, the system further comprises computer readable instructions that, when executed by the processor, control the processor to log a minimum temperature sensed by the temperature sensor during the wash cycle.

In some embodiments of the first aspect, the system further comprises computer readable instructions that, when executed by the processor, control the processor to log a temperature profile sensed by the temperature sensor during the wash cycle.

In some embodiments of the first aspect, the system further comprises computer readable instructions that, when executed by the processor, control the processor to receive an initiation signal indicative of start of the wash cycle.

In some embodiments of the first aspect, the initiation signal is received when a button on the dishwasher thermometer is pressed.

In some embodiments of the first aspect, the initiation signal is automatically generated when a temperature detected by the temperature sensor is above a predetermined threshold.

In some embodiments of the first aspect, the initiation signal is automatically generated when an ambient light level, detected by an ambient light sensor, is below a predetermined threshold.

In some embodiments of the first aspect, the system further comprises computer readable instructions that, when executed by the processor, control the processor to generate an alert when the maximum temperature is below a temperature threshold.

In some embodiments of the first aspect, the system further comprises computer readable instructions that, when executed by the processor, control the processor to transmit the alert to one or more of a transceiver, a monitor device, a server, and a third party, each remotely located from the dishwasher thermometer.

In some embodiments of the first aspect, the system further comprises computer readable instructions that, when executed by the processor, control the processor to receive a cycle end signal indicative of end of the wash cycle.

In some embodiments of the first aspect, the cycle end signal is received when a button on the dishwasher thermometer is pressed.

In some embodiments of the first aspect, the cycle end signal is automatically generated when a temperature sensed after start of the wash cycle by the temperature sensor is below a predetermined threshold.

In some embodiments of the first aspect, the cycle end signal is automatically generated when an ambient light level, detected after start of the wash cycle by an ambient light sensor, is above a predetermined threshold.

In some embodiments of the first aspect, the system further comprises a display interface for displaying an indication of the maximum temperature.

In some embodiments of the first aspect, the system further comprises a speaker for emitting an audible alert when the maximum temperature does not reach a predetermined threshold during the wash cycle.

In a second aspect, a method for wireless temperature logging of a dishwasher wash cycle comprises: capturing a maximum temperature during the wash cycle sensed by a temperature sensor of a dishwasher thermometer positioned within the dishwasher; transmitting, via a wireless communications interface of the dishwasher thermometer, the maximum temperature to a device remote from the dishwasher thermometer.

In some embodiments of the second aspect, the method further comprises capturing a minimum temperature sensed by the temperature sensor during the wash cycle; and transmitting the minimum temperature to the device.

In some embodiments of the second aspect, the method further comprises capturing a temperature profile sensed by the temperature sensor during the wash cycle; and transmitting the temperature profile to the device.

In some embodiments of the second aspect, the method further comprises generating an alert when the maximum temperature does not reach a predefined threshold during the wash cycle.

In some embodiments of the second aspect, the step of generating an alert includes transmitting the alert to one or more of a monitor device, a server, and a third party remote from the dishwasher thermometer.

In some embodiments of the second aspect, the step of generating an alert includes audibly emitting the alert via a speaker of the dishwasher thermometer.

In some embodiments of the second aspect, the method further comprises receiving an initiation signal indicative of a start of the wash cycle.

In some embodiments of the second aspect, the method further comprises generating the initiation signal by: detecting press of a button on the dishwasher thermometer, determining when a temperature sensed by the temperature sensor is above a predefined temperature threshold, or determining when ambient light around the dishwasher thermometer is below a predefined ambient light threshold.

In some embodiments of the second aspect, the method further comprises receiving a cycle end signal indicative of an end of the wash cycle.

In some embodiments of the second aspect, the method further comprises generating the cycle end signal by: detecting press of a button on the dishwasher thermometer, determining when a temperature sensed by the temperature sensor after the start of the wash cycle is below a predefined temperature threshold, or determining when ambient light around the dishwasher thermometer after the start of the wash cycle is above a predefined ambient light threshold.

In some embodiments of the second aspect, the step of transmitting includes transmitting the maximum temperature from the dishwasher thermometer to a server, the method further comprising allowing a third party to access historical data of the dishwasher thermometer received at the server.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
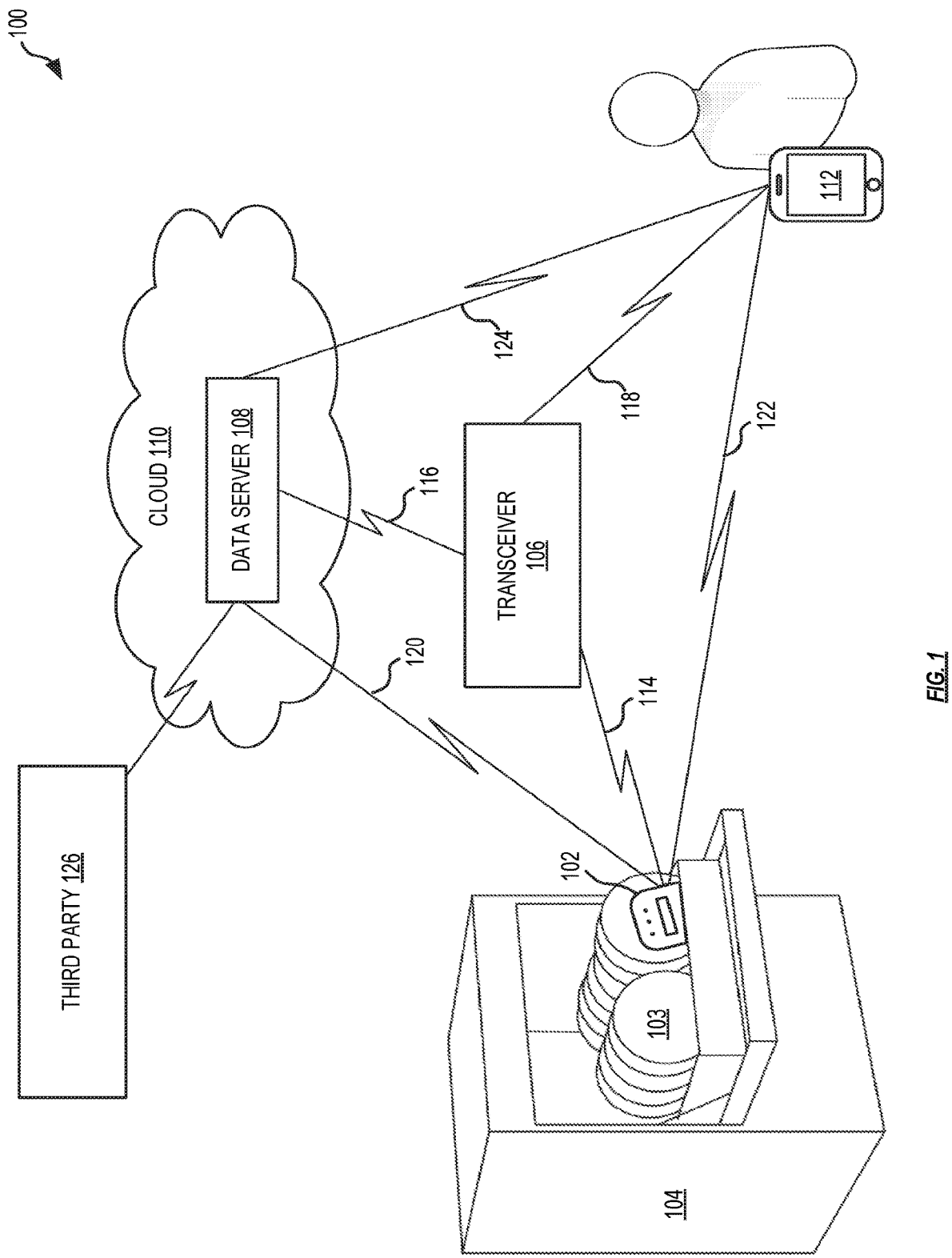
FIG. 1 depicts a dishwasher thermometer with wireless temperature logger, in an embodiment.

FIG. 1 depicts a dishwasher thermometer with wireless temperature logger system 100, in an embodiment. System 100 includes at least one dishwasher thermometer 102 that is configured for positioning within a dishwasher 104 near to dishes 103 therein and wireless communication with one or more of, a transceiver 106, a data server 108 located within the cloud 110, and a monitor device 112.

The transceiver 106 operates to relay communications between various components of the system 100. For example, the transceiver 106 may be necessary when transmissions from the dishwasher thermometer 102 cannot be received during operation of the dishwasher 104 when the dishwasher 104 is closed because the dishwasher 104 acts as a Faraday cage and thus blocks or otherwise inhibits wireless communication between the dishwasher thermometer 102 and the data server 108. Accordingly, the transceiver 106 may be positioned in close proximity to the dishwasher 104 (or even integrated with the dishwasher 104) such that the wireless signals from the dishwasher thermometer 102 may be received by the transceiver 106.

A first communication path 114 represents wireless communication between the dishwasher thermometer 102 and the transceiver 106. A second communication path 116 represents communication between the data server 108 and the transceiver 106. A third communication path 118 represents communication between the monitor device 112 and the transceiver 106.

It should be appreciated, however, that direct communication may occur between individual components of the system 100. For example, the dishwasher thermometer 102 may wirelessly communicate with the data server 108 via a fourth communication path 120. Additionally, the dishwasher thermometer 102 may wirelessly communicate with the monitor device 112 via a fifth communication path 122. Additionally, the monitor device 112 may wirelessly communicate with the data server 108 via a sixth communication path 124.

As such, the system 100 may be configured to use any one or more of the first, second, third, fourth, fifth, and sixth communication paths 114, 116, 118, 120, 122, 124, respectively, without departing from the scope hereof. Each of the first, second, third, fourth, fifth, and sixth communication paths 114, 116, 118, 120, 122, 124, respectively, may use one or more known wireless protocols including but not limited to cellular (2G, 3G, 4G, 5G, LTE, NB-IoT, etc.), Wi-Fi (802.11 standard), Bluetooth, Bluetooth Low-Energy, Zigbee, or any other known wireless communication protocol.

Figure 2:
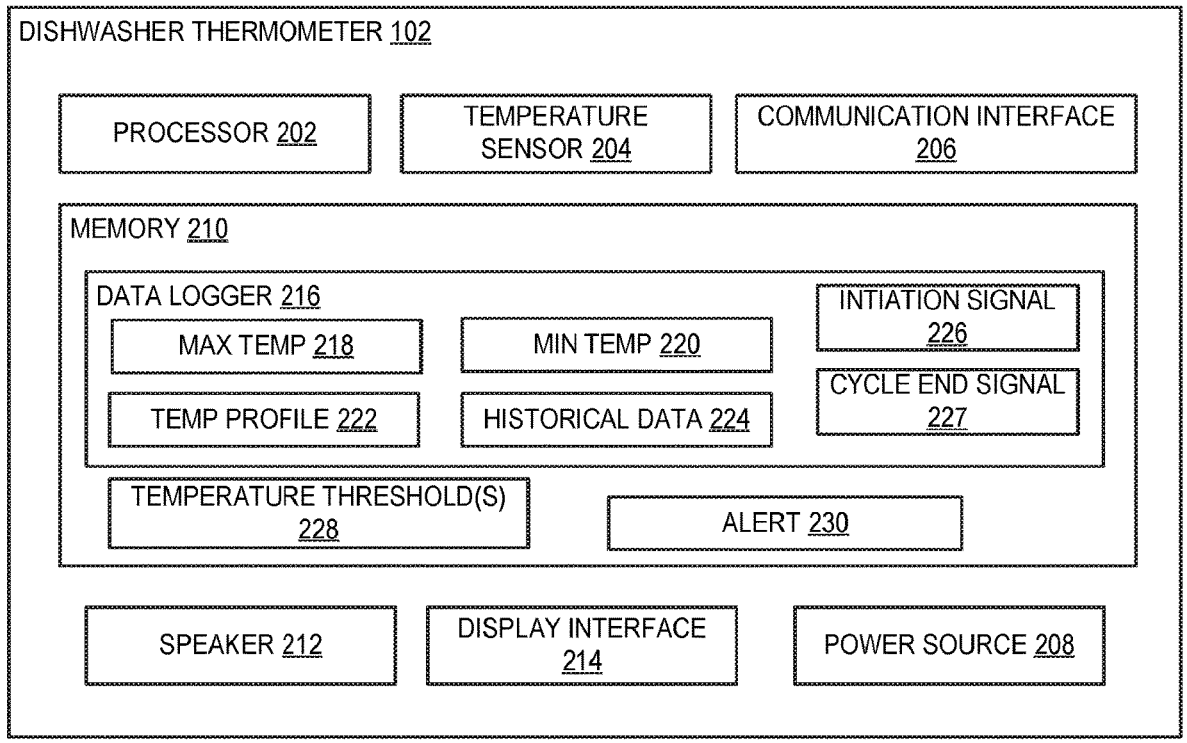
FIG. 2 depicts the dishwasher thermometer of FIG. 1 in further example detail, in embodiments.

FIG. 2 depicts the dishwasher thermometer 102 in further example detail, in embodiments. The dishwasher thermometer 102 may include a housing (not shown) that is sealed such that the dishwasher thermometer 102 is waterproof to meet the standards required for use with the dishwasher 104 (e.g., IP66, IP67, or other standard). In embodiments, the housing may be dish-shaped (e.g., circular to mimic a plate shape, or cylindrical to mimic a glassware shape, or elongated to mimic a knife shape).

The dishwasher thermometer 102, located within the housing, includes a processor 202, a temperature sensor 204, a communications interface 206, a power source 208, and a memory 210. The dishwasher thermometer 102 may also include one or more of a speaker 212 and a display interface 214.

The processor 202 includes any one or more microprocessor or other device capable of executing computer readable instructions stored within the memory 210 to implement the function of the dishwasher thermometer 102 discussed herein.

The temperature sensor 204 is integrated within the housing to sense the surface temperature of the housing. The temperature sensor 204 may be a single sensor or more than one sensor without departing from the scope hereof. The temperature sensor 204 may be located adjacent a cap (see FIG. 5, discussed below) such as a metal or high temperature conducting material. The cap may be over-molded into the housing.

The communications interface 206 includes hardware capable of transmitting and receiving data along or more of the first, fourth, and fifth communication paths 114, 120, 122, respectively. Accordingly, the communications interface 206 may be configured according to any of the above discussed wireless protocols including but not limited to cellular (2G, 3G, 4G, 5G, LTE, NB-IoT, etc.), Wi-Fi (802.11 standard), Bluetooth, Bluetooth Low-Energy, Zigbee, or any other known wireless communication protocol.

The power source 208 may be a battery. In embodiments, the battery is a rechargeable (via electrical contacts on the housing or inductive charging) battery that is sealed within the housing to reduce potential leakage points within the housing. Alternatively, the battery is a removable battery and a removable battery cover with waterproof gasket is located at the housing.

The memory 210 may include volatile and/or non-volatile memory that stores transitory and or non-transitory computer readable instructions that, when executed by the processor 202, implement the functionality of the dishwasher thermometer 102 as discussed herein. For example, the memory 210 may store a data logger 216 as such computer readable instructions. The data logger 216 may operate to capture temperature sensed by the temperature sensor 204. The data logger 204 may process the captured temperature readings and determine a max temperature 218, a minimum temperature 220, and a temperature profile 222. The data logger 204 may store each of the max temperature 218, the minimum temperature 220, and the temperature profile 222 for each washing cycle in a historical database 224. The maximum temperature 218 indicates the highest temperature reached during the given dishwashing cycle. The minimum temperature 220 indicates the minimum temperature reached during the given dishwashing cycle. In embodiments, the minimum temperature 220 is not captured until a given delay (e.g., a time delay or a temperature delay) to allow the dishwasher to initiate the washing cycle prior to capturing the data. The temperature profile 222 may be used to generate a graphical representation of the temperature in relation to time of the dishwashing cycle. Because the temperature sensor 204 is located at the surface of the housing of the dishwasher thermometer 102, the maximum temperature 218, the minimum temperature 220, and the temperature profile 222 represent temperatures reached on the surface of dishes and utensils placed within the dishwasher 104.

The data logger 216 may be triggered to start recording by an initiation signal 226. The initiation signal 226, in embodiments, indicates that the dishwashing cycle is beginning, or about to begin. The initiation signal 226 may be generated within the dishwasher thermometer 102 in response to a press of a button (not shown) on the housing of the dishwasher thermometer 102 immediately prior to initiating the wash cycle. In another example, the initiation signal 226 is automatically determined by the dishwasher thermometer 102 in response to a temperature reading from the temperature sensor 204 being above a predefined threshold. In another example, the initiation signal 226 is automatically generated by the dishwasher thermometer 102 when an ambient light level (as detected by an ambient light sensor, such as a camera or photodiode, located at the housing, not shown) transitions below a pre-defined threshold.

During each dishwashing cycle, the data logger 216 may further compare the maximum temperature 218 (and/or the minimum temperature 220, and/or the current temperature as defined by the temperature profile 222) against one or more temperature threshold 228 to determine whether the washing cycle is properly sanitizing and/or cleaning the dishes. In certain embodiments, the temperature thresholds 228 may be pre-set within the dishwasher thermometer 102. In other embodiments, the temperature thresholds 228 may be configured by a user of the monitor device 112, and transmitted to the dishwasher thermometer 102 from the monitor device 112 via one or more of the fifth communication path 122, and the first and third communication paths 114, 118.

When the temperature does not meet the constraints defined by the temperature threshold 228, the data logger 216 may generate an alert 230. The alert 230 may be transmitted to the monitor device 112 and/or the server 108. In embodiments including the speaker 212 and/or display interface 214, the alert 230 may be an audible alert emitted over the speaker 212 and/or displayed on the display interface 214. For example, the alert 230 may cause the speaker 212 to emit a siren or beeping noise, and/or the display interface 214 to display the alert, such that the dishwasher or employee knows to re-run the dishwasher and/or perform maintenance thereon. The display interface 214 may be an LCD screen, or an LED light with a binary indication of whether the maximum and/or minimum temperature meets the temperature threshold(s) 228. In certain embodiments, where the dishwasher 104 is a connected device, such as where the transceiver 106 is integral with the dishwasher 104, the alert 230 may be transmitted to the dishwasher 104 such that the alert 230 automatically causes the dishwasher 104 to re-run the dishwashing cycle at a higher temperature. This is particularly useful where the dishwasher 104 is not observed when running, such as when run overnight, since the cycle may be restarted such that it is finished by the time the employees return (by morning).

Data logger 216 may continue to capture temperature data of the wash cycle until receipt of a cycle end signal 227. The cycle end signal 227 may indicate that the dishwashing cycle has ended, or is about to end. The cycle end signal 227 may be generated within the dishwashing thermometer 102 when a button (not shown) on the housing of the dishwasher thermometer 102 is pressed just after opening the dishwasher 104 at the end of a wash cycle. In another example, the cycle end signal 227 is automatically generated by the dishwasher thermometer 102 in response to a detection of a temperature reading from the temperature sensor 204 being below a predefined threshold and after receipt of the initiation signal 226. In another example, the cycle end signal 227 is automatically generated when the dishwasher thermometer 102 detects an ambient light level (as detected by an ambient light sensor located at the housing, not shown) above a pre-defined threshold after the initiation signal 226.

The speaker 212 may be a waterproof speaker capable of emitting an audible sound. The display interface 214 may be a waterproof display, and/or touch screen, configured to display data, such as the max temperature 218, the minimum temperature 220, the temperature profile 222, the historical data 224, the temperature threshold 228, and/or the alert 230. In embodiments, the display interface 214 is also capable of interacting with a user (such as an employee) to receive the initiation signal 226.

Figure 3:
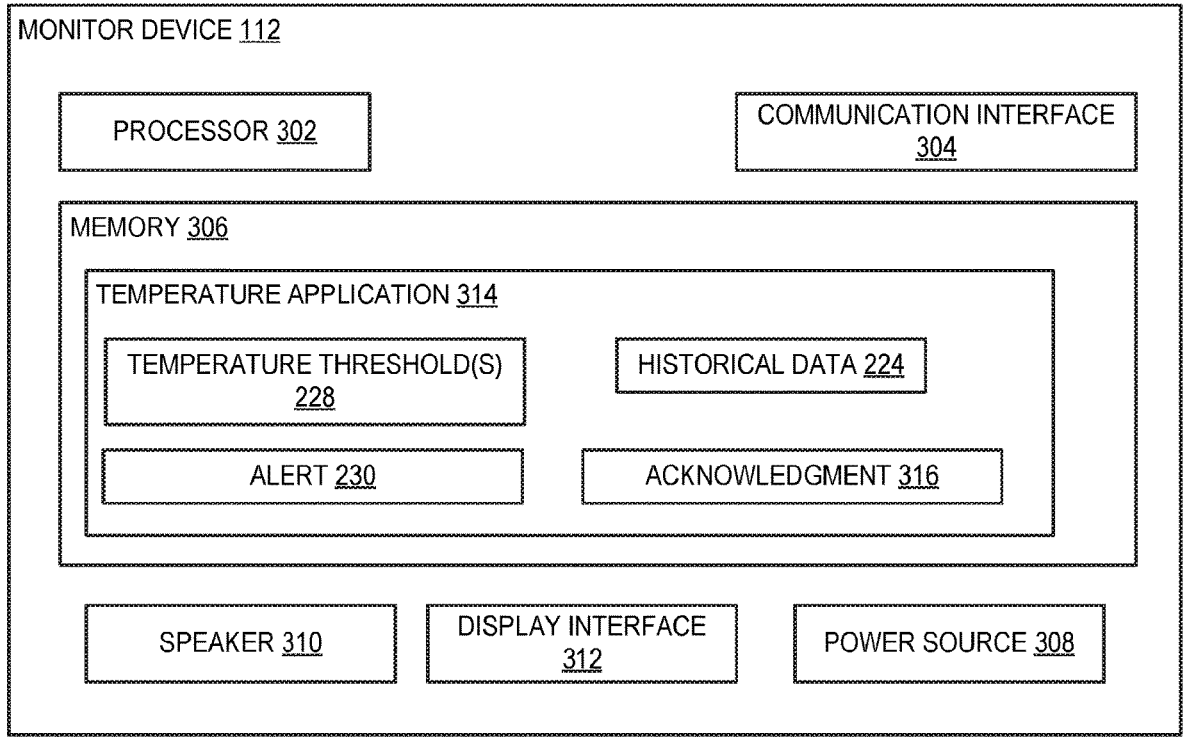
FIG. 3 depicts the monitor device of FIG. 1 in further example detail, in embodiments.

FIG. 3 depicts the monitor device 112 in further detail, in embodiments. The monitor device 112 includes a processor 302, a communications interface 304, a memory 306, a power source 308, a speaker 310, and a display interface 312. In embodiments, the monitor device 112 may be a laptop computer, desktop computer, a tablet, a smartphone, or other device that is specially programmed to implement the functionality of the monitor device 112 discussed herein.

The processor 302 includes any one or more microprocessor or other device capable of executing computer readable instructions stored within the memory 306 to implement the function of the monitor device 112 discussed herein.

The communications interface 306 includes hardware capable of transmitting and receiving data along or more of the third, fifth, and sixth communication paths 118, 122, 124, respectively. Accordingly, the communications interface 306 may be configured according to any of the above discussed wireless protocols including but not limited to cellular (2G, 3G, 4G, 5G, LTE, NB-IoT, etc.), Wi-Fi (802.11 standard), Bluetooth, Bluetooth Low-Energy, Zigbee, or any other known wireless communication protocol.

The memory 306 may include volatile and/or non-volatile memory that stores transitory and or non-transitory computer readable instructions that, when executed by the processor 302, implement the functionality of the monitor device 112 as discussed herein. For example, the memory 306 may store a temperature application 314 as such computer readable instructions. The temperature application 314 may be pre-loaded or downloaded onto the monitor device 112 and may be displayed on the display interface 312. The temperature application 314 may prompt a user to interact with the display interface 312 to provide the temperature thresholds 228, which are then transmitted from the monitor device 112 to the dishwasher thermometer 102. The temperature application 314 may further display the historical data 224 to the user either automatically or on-demand. The temperature application 314 may advise the user of the alert 230, via one or both of the speaker 310 and the display interface 312, when the alert 230 is received at the monitor device 112 from the dishwasher thermometer 102.

The speaker 310 may be a waterproof speaker capable of emitting an audible sound. The display interface 312 may be a display and/or touch screen, configured to display data, such as the historical data 224 (which may include the max temperature 218, the minimum temperature 220, and the temperature profile 222 for one or more dishwashing cycles), the temperature threshold 228, and/or the alert 230. In embodiments, the display interface 312 is also capable of interacting with a user (such as an employee) to receive the temperature threshold 228 or an acknowledgment 316 of the alert 230. The acknowledgment 316, in embodiments, may also be automatically generated by the dishwasher thermometer 102 or server 108, such as by verifying a subsequent initiation signal 226 was generated within a predefined amount of time indicating that the same dishes were re-washed.

When the acknowledgment 316 is received, the alert 230 and acknowledgment 316 may be transmitted to, and stored in the server 108 to verify that the user was aware that the dishes needed re-washing (or that the dishes were re-washed) for proper sanitization and/or cleaning. Furthermore, when the acknowledgment 316 is not received, the alert 230 may be stored on the server 108 to indicate that the dishes were not re-washed and thus were not properly sanitized and cleaned.

Figure 4:
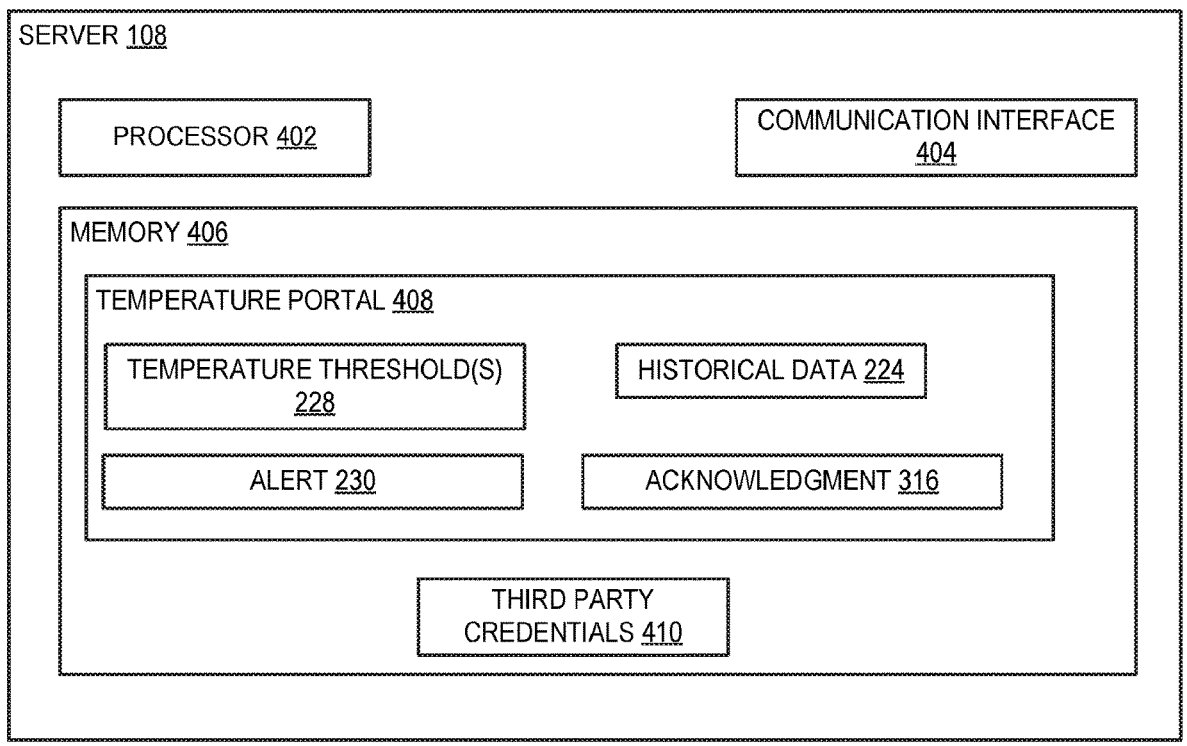
FIG. 4 depicts the server of FIG. 1 in further example detail, in embodiments.

FIG. 4 depicts the server 108 of FIG. 1 in further example detail, in embodiments. The server 108 functions as a back-end processing and data management service of the system 100. The server 108 includes a processor 402, a communications interface 404, and a memory 406.

The processor 402 includes any one or more processor, microprocessor, or other device capable of executing computer readable instructions stored within the memory 406 to implement the function of the server 108 discussed herein.

The communications interface 406 includes hardware capable of transmitting and receiving data along or more of the second, fourth, and sixth communication paths 116, 120, 124, respectively. Accordingly, the communications interface 406 may be configured according to any of the above discussed wireless protocols including but not limited to cellular (2G, 3G, 4G, 5G, LTE, NB-IoT, etc.), Wi-Fi (802.11 standard), Bluetooth, Bluetooth Low-Energy, Zigbee, or any other known wireless communication protocol.

The memory 406 may include volatile and/or non-volatile memory that stores transitory and or non-transitory computer readable instructions that, when executed by the processor 402, implement the functionality of the server 108 as discussed herein. For example, the memory 406 may store a temperature portal 408 as such computer readable instructions. The temperature portal 408 may be a website, or other remotely accessible location, accessible by the dishwasher thermometer 102, the transceiver 106, and the monitor device 112. The temperature portal 408 may provide access for storing and retrieving data including, but not limited to, the historical data 224 (including one or more of the max temperature 218, minimum temperature 220, and temperature profile 222 for each wash cycle performed by the dishwasher 104), temperature thresholds 228, and any alerts 230 generated by the system 100, and any acknowledgments 316 received by the system 100.

In certain embodiments, the temperature portal 408 is not only accessible by components of system 100 that are registered to a specific dishwasher thermometer 102 (e.g., the transceiver 106 and the monitor device 112), but may also be accessible by a third party 126 (FIG. 1). The third party 126 may be a government agency assigned to monitor cleanliness of a commercial establishment using the dishwasher 104. The third party 126 may also represent any other entity approved by the owner of the dishwasher thermometer 112. Accordingly, the memory 406 may also include third party credentials 410 that are used to verify access to the temperature portal 408 via the third party 126.

In certain embodiments, information from the temperature portal 408 is automatically transmitted to the third party 126. For example, when the alert 230 is generated, the temperature portal 408 may automatically transmit the alert 230 to the third party 126. In certain embodiments, the alert 230 is only automatically transmitted to the third party 126 when the acknowledgment 316 is not received.

By allowing a third party 126 to access the temperature portal 408 (and/or automatically transmitting notifications of the alerts 230 to the third party 126), system 100 provides an automated system to eliminate errors (either intentional or unintentional) occurring with manual recordation of the operating temperature of the dishwasher 104. Furthermore, safety inspectors do not have to go to the establishment to manually inspect the dishwasher 104 temperature, thereby significantly reducing inspection approval time and frequency. Accordingly, the historical data 224 may be kept on either the device memory, or the temperature application 314, or the data server 108 automatically, the historical data 224 could be even recorded and searched on demand by third party 126 for auditing purpose in order to meet the standards of health and sanitation.

Figure 5:
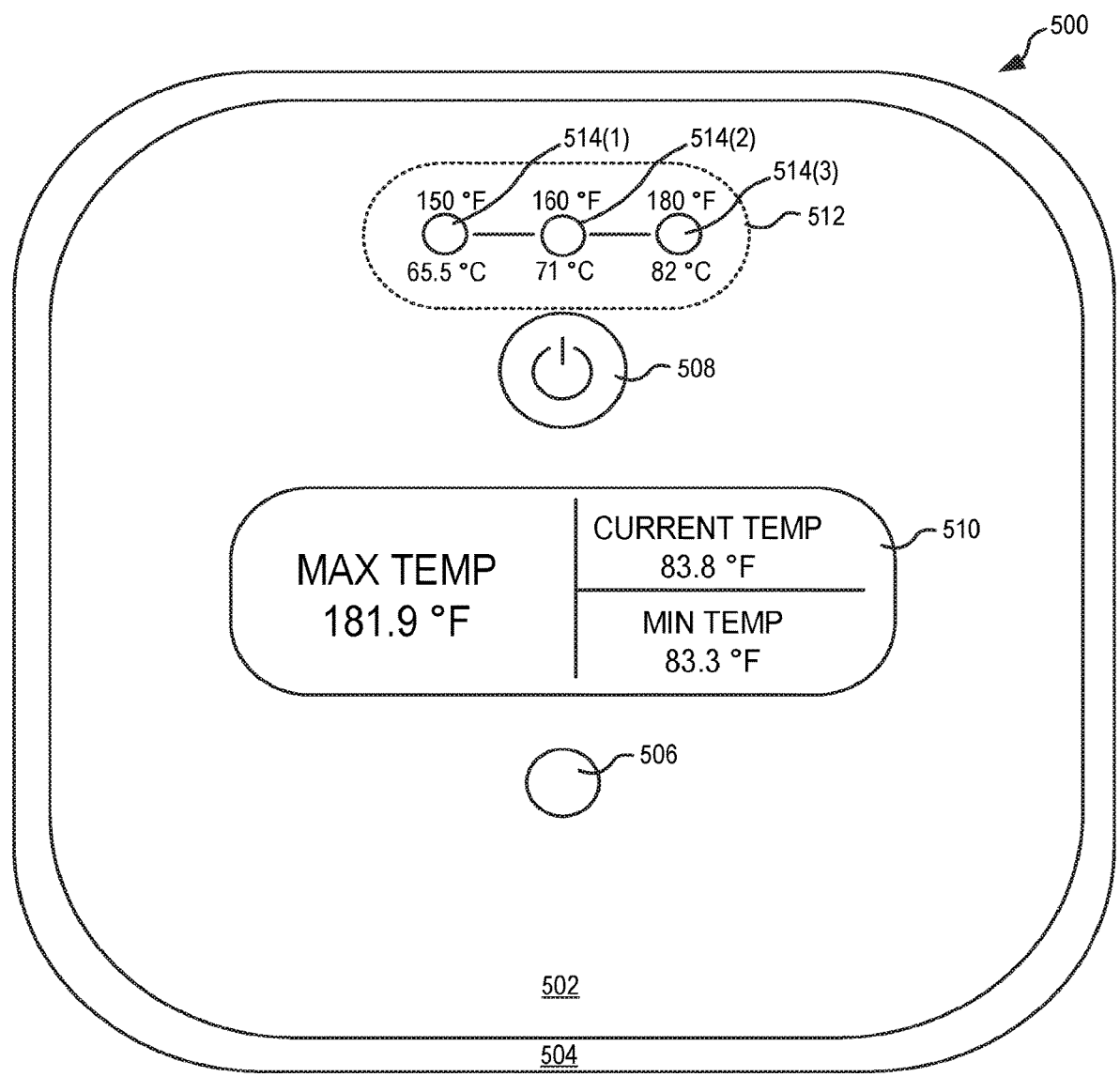
FIG. 5 depicts an example plan view of a dishwasher thermometer, which is an example of the dishwasher thermometer of FIG. 1, in embodiments.

FIG. 5 depicts an example plan view of a dishwasher thermometer 500, which is an example of the dishwasher thermometer 102 of FIG. 1, in embodiments. The dishwasher thermometer 500 includes a housing 502 encasing electronics therewith (e.g., the processor 202, temperature sensor 204, communication interface 206, power source 208, memory 210, speaker 212, and display interface 214). Dishwasher thermometer 500 is also shown with a bumper 504 located at the perimeter of the housing 500. The bumper 504 may be rubber, plastic, silicon, or other material and absorbs shocks that occur during use and handling of the dishwasher thermometer 500. It should be appreciated that the bumper 504 is not included in certain embodiments.

A temperature sensor assembly 506, which is an example of the temperature sensor 206 of FIG. 2, is positioned at an exterior surface of the housing 502. It should be appreciated that although only one temperature sensor assembly 506 is shown, more than one may be included without departing from the scope hereof. FIG. 5 depicts the cap of the temperature sensor assembly 506, and the temperature sensor is located therebelow.

A button 508 is also positioned on the exterior surface of the housing 502. The button 508 may be used to turn on and turn off the dishwasher thermometer 502. Furthermore, in certain embodiments, various interactions with the button may perform an action with respect to the dishwasher thermometer 502. For example, a short press of the button 508 when the dishwasher thermometer 502 is turned on may generate the initiation signal 226 discussed above.

A first display interface 510 and a second display interface 512 are also positioned on the exterior surface of the housing 502. The first display interface 510 and the second display interface 512 are, individually or collectively, examples of the display interface 214 discussed above with respect to FIG. 2.

The first display interface 510 includes a digital display screen, such as a LCD, OLED, or other display screen technology. The first display interface 510 displays precise information, such as the maximum temperature (e.g., maximum temperature 218), the minimum temperature (e.g., minimum temperature 220), and current temperature (e.g., as determined from the temperature profile 222).

The second display interface 512 includes quick-reference temperature guides. The second display interface 512 includes three LEDs 514(1)-(3). Each LED activates (e.g., turns on) when the temperature during a wash cycle reaches a given threshold (e.g., 150° F. for LED 514(1), 160° F. for LED 514(2), and 180° F. for LED 514(3)). It should be appreciated that there may be more or fewer LEDs without departing from the scope hereof.

Figure 6:
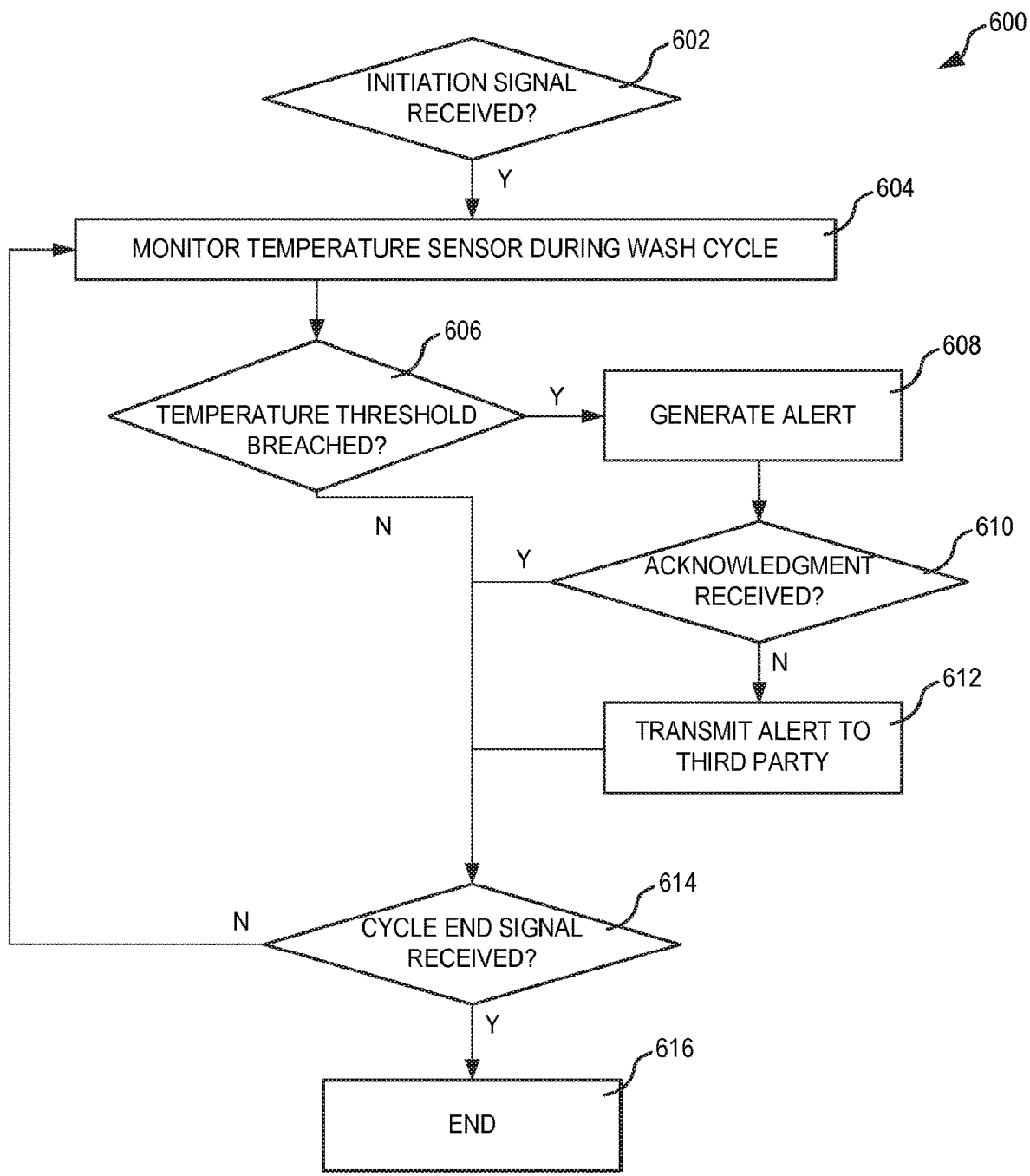
FIG. 6 depicts an example method for monitoring dishwasher temperature using a dishwasher thermometer with wireless temperature logger, in embodiments

FIG. 6 depicts a method 600 for monitoring dishwasher temperature using a dishwasher thermometer with wireless temperature logger, in embodiments. Method 600 is implemented, for example, using system 100 discussed above in FIGS. 1-4.

Block 602 is a decision. In block 602, method 600 determines whether an initiation signal is received. When an initiation signal is received, method 600 proceeds with block 604, otherwise method 600 repeats block 602 until the initiation signal is received. In one example of block 602, the processor 202 executes instructions of the data logger 216 to determine when the initiation signal 226 is received. For example, the processor 202 may determine when a button (not shown) on the housing of the dishwasher thermometer 102 has been pressed. In another example of block 602, the processor 202 may determine when a temperature reading from the temperature sensor 204 is above a predefined threshold. In another example of block 602, the processor 202 may determine when an ambient light level (as detected by an ambient light sensor located at the housing, not shown) is below a pre-defined threshold.

In block 604, the method 600 monitors one or more temperature sensors of the dishwasher thermometer during the wash cycle. In one example of block 604, the processor 202 executes the data logger 216 to monitor temperature readings from the temperature sensor 204. In block 604, the processor 202 may capture one or more of the maximum temperature 218, the minimum temperature 220 and a temperature profile 222 of the wash cycle of the dishwasher 104.

Block 606 is a decision. If, in block 606, method 600 determines that a temperature threshold has been breached, method 600 proceeds with block 608, otherwise method 600 proceeds with block 614. In one example of block 606, the processor 202 executes the data logger 216 to compare the maximum temperature 218 and/or the minimum temperature 220 against the temperature threshold(s) 228 to determine whether the thresholds 228 have been breached. It should be appreciated that block 606 may also be performed by processor 402 of the data server 108 to compare the historical data 224 against the temperature thresholds 228.

In block 608, method 600 generates an alert defining the breached threshold. In one example of block 608, the processor 202 executes the data logger 216 to generate the alert 230. The alert 230 generated in block 608 may be transmitted to one or more of the transceiver 106, the server 108, the monitor device 112, and the third party 126. It should be appreciated that block 608 may also be performed by the data server 108 by processor 402 generating the alert 230.

Block 610 is a decision. In block 610, the method 600 determines whether an acknowledgment is received. If yes, then method 600 proceeds with block 614, otherwise method 600 proceeds with block 612. In one example of block 610, the processor 402 determines whether the acknowledgment 230 has been received from the user.

In block 612, the method 600 transmits the alert to a third party. In one example of block 612, the dishwasher thermometer 102 or the server 108 transmits the alert 230 to the third party 126 when the acknowledgment 316 was not received from the user by the monitor device 112.

Block 614 is a decision. If, in block 614, method 600 determines that a cycle end signal has been received, method 600 proceeds with block 616 and ends, otherwise method 600 continues with block 604. In one example of block 614, the processor 202 executes the data logger 216 to determine when the cycle end signal 227 is received. For example, the processor 202 may determine when a button (not shown) on the housing of the dishwasher thermometer 102 has been pressed. In another example, the processor 202 may determine when a temperature reading from the temperature sensor 204 is below a predefined threshold. In another example, the processor 202 may determine when an ambient light level (as detected by an ambient light sensor located at the housing, not shown) is above a pre-defined threshold.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for wireless temperature logging of a dishwasher wash cycle, comprising:
generating an initiation signal indicative of a start of the wash cycle, when a temperature sensed by a temperature sensor of a dishwasher thermometer positioned within the dishwasher is above a predefined temperature threshold, wherein the dishwasher thermometer is a unitary item configured to be removably placed in a washing chamber of the dishwasher;
triggering a data logger to start monitoring the temperature sensor in response to the initiation signal;
capturing a maximum temperature during the wash cycle sensed by the temperature sensor;
transmitting, via a wireless communications interface of the dishwasher thermometer, the maximum temperature to a device remote from the dishwasher thermometer using a transceiver in the dishwasher;
generating a cycle end signal in response to the detection of a temperature by the temperature sensor below a predefined threshold after receipt of the initiation signal;
causing the data logger to stop monitoring the temperature sensor in response to the cycle end signal;
generating an alert signaling that the maximum temperature does not reach a predefined threshold during the wash cycle;
transmitting, via the wireless communication interface, the alert to the transceiver in the dishwasher; and
automatically rerunning the dishwasher wash cycle in response to the alert.

2. The method of claim 1, further comprising:
capturing a minimum temperature sensed by the temperature sensor during the wash cycle; and
transmitting the minimum temperature to the device.

3. The method of claim 1, further comprising:
capturing a temperature profile sensed by the temperature sensor during the wash cycle; and
transmitting the temperature profile to the device.

4. The method of claim 1, the step of generating an alert comprising transmitting the alert to one or more of a monitor device, a server, and a third party remote from the dishwasher thermometer.

5. The method of claim 1, the step of generating an alert including audibly emitting the alert via a speaker of the dishwasher thermometer.

6. The method of claim 1, the step of transmitting the maximum temperature comprises transmitting the maximum temperature from the dishwasher thermometer to a server, the method further comprising allowing a third party to access historical data of the dishwasher thermometer received at the server.

* * * * *